US008744487B2

(12) United States Patent
Jovicic et al.

(10) Patent No.: US 8,744,487 B2
(45) Date of Patent: Jun. 3, 2014

(54) METHODS AND APPARATUS FOR DETERMINING MOBILE DEVICE LOCATION IN A COMMUNICATIONS SYSTEM

(75) Inventors: Aleksandar Jovicic, Jersey City, NJ (US); Cyril Measson, Somerville, NJ (US); Thomas Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 375 days.

(21) Appl. No.: 13/008,965

(22) Filed: Jan. 19, 2011

(65) Prior Publication Data

US 2012/0184301 A1    Jul. 19, 2012

(51) Int. Cl.
*H04W 24/00* (2009.01)
(52) U.S. Cl.
USPC ... 455/456.2; 455/41.2; 455/41.3; 455/456.1; 455/456.3; 455/456.4; 455/456.5
(58) Field of Classification Search
USPC ............................ 455/41.2, 41.3, 456.1–456.6
See application file for complete search history.

(56) References Cited

U.S. PATENT DOCUMENTS

| 7,072,671 | B2 * | 7/2006 | Leitch ........................ 455/456.1 |
| 7,084,809 | B2 | 8/2006 | Hockley, Jr. et al. |
| 7,129,891 | B2 | 10/2006 | Meunier |
| 7,308,273 | B2 | 12/2007 | Zhang |
| 2005/0020275 | A1 * | 1/2005 | Agrawala et al. .......... 455/456.1 |
| 2005/0111383 | A1 * | 5/2005 | Grob et al. .................... 370/254 |
| 2006/0183485 | A1 * | 8/2006 | Mizugaki et al. .......... 455/456.1 |
| 2006/0267841 | A1 | 11/2006 | Lee et al. |
| 2009/0323648 | A1 * | 12/2009 | Park et al. ..................... 370/338 |
| 2012/0157121 | A1 * | 6/2012 | Li et al. ....................... 455/456.2 |

FOREIGN PATENT DOCUMENTS

| EP | 2116863 A1 | 11/2009 |
| EP | 2229015 A2 | 9/2010 |
| WO | 0128272 A1 | 4/2001 |
| WO | 2008111913 A1 | 9/2008 |
| WO | 2009046767 A1 | 4/2009 |

OTHER PUBLICATIONS

A. Shafiei, et al., "Cooperative Mobile Positioning Based on Received Signal Strength," in Proc. of the International Symposium on Telecommunications, ITRC, Tehran, Iran, Aug. 27-28, 2008.
Simone Frattasi, et al., "On the Use of Cooperation to Enhance the Location Estimation Accuracy", IEEE Center for TeleInFrastruktur (CTIF), Aalborg University, 2006, pp. 1-5.
International Search Report and Written Opinion—PCT/US2012/02146—ISA/EPO—Apr. 17, 2012.

* cited by examiner

*Primary Examiner* — Charles Appiah
*Assistant Examiner* — Jaime Holliday
(74) *Attorney, Agent, or Firm* — James K. O'Hare

(57) ABSTRACT

Methods and apparatus related to determining location of one or more mobile devices based on signals received by mobile device and signals received by fixed devices such as access points (APs) in a communications system are described. In accordance with various embodiments, mobile devices, e.g., peer devices, measure one or more signal characteristics, e.g., received signal power level, of signals received from peer devices and report this information along with information identifying the peer devices to which individual signal measurements correspond. The time of the signal measurements is also reported allowing a location determination server to time align signal measurements made by multiple different devices, e.g., mobile devices and access points, and use signals measurements from the multiple devices to determine the location of one or mobile devices, e.g., at one or more points in time, with more accuracy than if AP signal measurement alone were used.

21 Claims, 9 Drawing Sheets

| RULES FOR TRANSMITTING SIGNAL MEASUREMENT AND DEVICE INFORMATION FROM A MOBILE DEVICE ||
|---|---|
| TRANSMISSION CONSTRAINT/ CONDITION | ACTION TO BE TAKEN |
| 702 → ONE OR MORE ACCESS POINTS WITH A COMMUNICATIONS LINK TO THE MOBILE DEVICE ARE AVAILABLE, EACH LINK HAVING AN SNR LEVEL ABOVE A MINIMUM THRESHOLD LEVEL | TRANSMIT THE STORED SIGNAL MEASUREMENT AND DEVICE INFORMATION TO AN ACCESS POINT HAVING A COMMUNICATIONS LINK WITH HIGHEST SNR LEVEL |
| 704 → AMOUNT OF STORED SIGNAL MEASUREMENT AND DEVICE INFORMATION REACHES A THRESHOLD, E.G., STORAGE LIMIT OF BUFFER REACHED | TRANSMIT THE STORED SIGNAL MEASUREMENT AND DEVICE INFORMATION TO THE CLOSEST ACCESS POINT OR AN ACCESS POINT WITH HIGHEST SNR |
| 706 → STORAGE TIME LIMIT CORRESPONDING TO ONE OR MORE SETS OF STORED SIGNAL MEASUREMENT AND DEVICE INFORMATION IS REACHED | TRANSMIT THE STORED SIGNAL MEASUREMENT AND DEVICE INFORMATION CORRESPONDING TO WHICH THE STORAGE TIME LIMIT IS REACHED, TO THE CLOSEST ACCESS POINT OR AN ACCESS POINT WITH HIGHEST SNR |
| 708 → REQUEST FOR INFORMATION CORRESPONDING TO ONE OR MORE PEER DEVICES IS RECEIVED | TRANSMIT THE STORED SIGNAL MEASUREMENT AND DEVICE INFORMATION CORRESPONDING TO THE ONE OR MORE DEVICES FOR WHICH THE REQUEST IS RECEIVED, E.G., TO AN ACCESS POINT VIA WHICH THE REQUEST IS RECEIVED |

FIGURE 7

METHODS AND APPARATUS FOR DETERMINING MOBILE DEVICE LOCATION IN A COMMUNICATIONS SYSTEM

FIELD

Various embodiments relate to wireless communications, and more particularly, to methods and apparatus for determining location of mobile devices in a communications system.

BACKGROUND

Determining mobile device location based on signals transmitted by a mobile device and received by fixed devices such as Access Points, is an approach used in some systems for determining the location of mobile devices. Unfortunately, given the spacing of Access Points, this approach is somewhat limited with the resolution and/or accuracy of mobile device location information which can be determined. For some services and/or applications location information down to one or a few meters is desired. Such information may be difficult or impossible to determine solely from the measurement of signals received at access points.

A network device may determine the position of a mobile device by measuring physical characteristics of signals transmitted by the mobile device and received by a set of access points, and using the measurements of the signals from the access points to determine the location of the mobile device. Unfortunately, if the determination of location is based simply on signal measurements made by access points, it may not be as accurate as may be desired due to the limited number of access points in a system.

It would be desirable from an accuracy standpoint, if mobile device location information could be determined from information which includes more than simply the signal measurements made by fixed devices, e.g., stationary devices at fixed locations such as access points.

SUMMARY

Methods and apparatus related to determining location of one or more mobile devices based on signals received by mobile device and signals received by fixed devices such as access points in a communications system are described. In accordance with various embodiments, mobile devices, e.g., peer devices, measure one or more signal characteristics, e.g., received signal power level, of signals received from peer devices. The mobile devices report this information along with information identifying the peer devices to which individual signal measurements correspond. In some embodiments the mobile device measured signals are peer discovery signals transmitted at a known power level and communicating a device identifier. The identifier as well as the strength of the peer discovery signal may, and in various embodiments are, measured and reported to, e.g., a location determination server, for use in determining the location of the identified device and/or other mobile devices. A set of signal measurements and corresponding identifiers corresponding to multiple wireless terminals which are detected in one or more discovery time intervals, may be communicated individual or as a set to the location determination server. The time of the signal measurements may also be reported allowing the location determination server to time align signal measurements made by multiple different devices, e.g., mobile devices and access points (APs) and use signals measurements from the multiple devices to determine the location of one or mobile devices, e.g., at one or more points in time.

The reported signal measurement information from a mobile node is received by a node in the network. The node in the network determines the location of individual mobile devices in the system using the signals transmitted by the mobile devices and measured by the access points along with the signal measurement and device identifier information reported by one or more other mobile devices. Since a general determination of the reporting device's location can be made from the signals received by the fixed anchor points (APs), the mobile device signal measurements provide an additional set of information which can be and is used, in combination with signal information from the fixed anchor points to determine the location of individual mobile devices. In this manner, the location of one or more mobile devices can be determined to a level of accuracy which might not be possible without the mobile device signal measurements and the reporting of those measurements to the network device responsible for making location determinations.

An exemplary method of operating a mobile communications device, in accordance with some embodiments, comprises: receiving a signal transmitted by at least one other device; measuring at least one radio frequency characteristic of the received signal; storing signal measurement information in combination with a peer device identifier identifying a device to which the signal measurement information being stored corresponds; and transmitting the stored signal measurement information and the corresponding peer device identifier when a transmission constraint is satisfied.

An exemplary mobile communications device, in accordance with some embodiments, comprises: at least one processor configured to: receive a signal transmitted by at least one other device; measure at least one radio frequency characteristic of the received signal; store signal measurement information in combination with a peer device identifier identifying a device to which the signal measurement information being stored corresponds; and transmit the stored signal measurement information and the corresponding peer device identifier when a transmission constraint is satisfied. The exemplary mobile communications device further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 7 illustrates an exemplary table including information regarding rules for transmitting stored signal measurement and related information from a mobile communications device in accordance with an exemplary embodiment.

DETAILED DESCRIPTION

Figure 1:
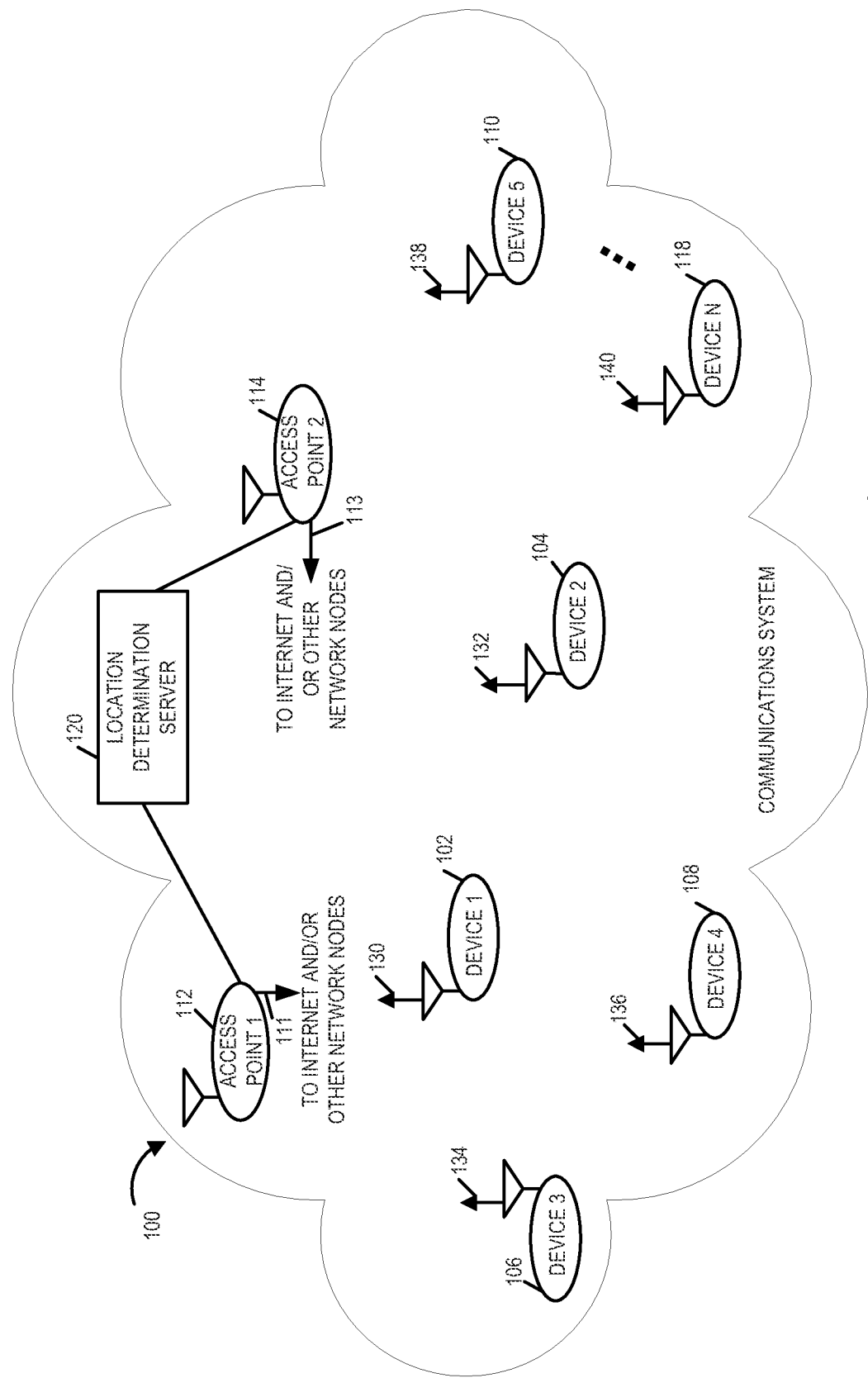
FIG. 1 is a drawing of an exemplary wireless communications system, e.g., peer to peer wireless communications system, in accordance with an exemplary embodiment.

FIG. 1 is a drawing of an exemplary wireless communication system 100, e.g., a peer to peer communications system in accordance with an exemplary embodiment. Exemplary wireless communications system 100 includes a plurality of wireless communications devices, e.g., peer to peer devices, including device 1 102, device 2 104, device 3 106, device 4 108, device 5 110, . . . , device N 118. In addition, the communications system 100 also includes a location determination server 120 and one or more access points (APs), e.g., base stations, such as access point 1 112 and access point 2 114. The access points 1 112, 2 114 in some embodiments are fixed location devices and include a wireless interface which supports peer to peer signaling protocol in addition to other wireless signaling protocols, and a wired interface providing coupling to a backhaul network. The access points 1 112, 2 114 are sometimes also referred to as anchor points. The APs 1 112, 2 114 may communicate with various mobile communications devices in the system, e.g., via a wireless link. The access points 1 112, 2 114 provide access to the Internet and/or other network nodes such as the location determination server 120, via a wired or fiber network connection 111, 113. Thus via APs 1 112, 2 114, information may be communicated to one or more wireless communications devices via wireless links. Various other wireless communications devices in system 100, e.g., device 1 102, device 2 104, device 3 106, device 4 108, device 5 110, and device N 118, are mobile wireless devices, e.g., handheld mobile devices.

One or more communications devices in system 100 may transmit and receive signals, e.g., peer discovery signals, paging signals and/or traffic data signals to/from one or more of other communications devices in the communications system 100. For the purpose of illustration, mobile communications devices 102, 104, 106, 108, . . . , 118 are shown as transmitting signals 130, 132, 134, 136, 138, . . . , 140 respectively. In some but not necessarily in all embodiments, signals 130, 132, 134, 136, 138, . . . , 140 are peer discovery signals transmitted at a known power level during a peer discovery time interval. In accordance with one aspect, one or more devices in system 100, e.g., mobile device 1 102, receive the signals from other communications devices in the system, measures a radio frequency (RF) characteristic of the received signal(s) and reports the signal measurement information along with a peer device identifier identifying a device to which the signal measurement information corresponds, to the location determination server 120 via an access point, e.g., such as AP 112, 114, when a transmission constraint is satisfied. The RF characteristics of a signal are sometimes also referred to as the fingerprints of signals.

The location determination server 120 receives a plurality of sets of information including signal measurement information corresponding to various devices from the access points in the system 100. The location determination server 120 is responsible for calculating the location of one or more devices in the system, e.g., based on the signal measurement information and other related information corresponding to the one or more devices, communicated to the location determination server 120. The location determination server 120 includes an input module which can receive input signals, an output module for communicating signals and/or other information to other communications devices, a processor, a set of control routines to control the operation of the server 120, and a storage element, e.g., memory. In various embodiments the location determination server 120 includes fingerprint prediction maps, e.g., a map of predicted values corresponding to a set of possible transmitter locations.

Figure 2:
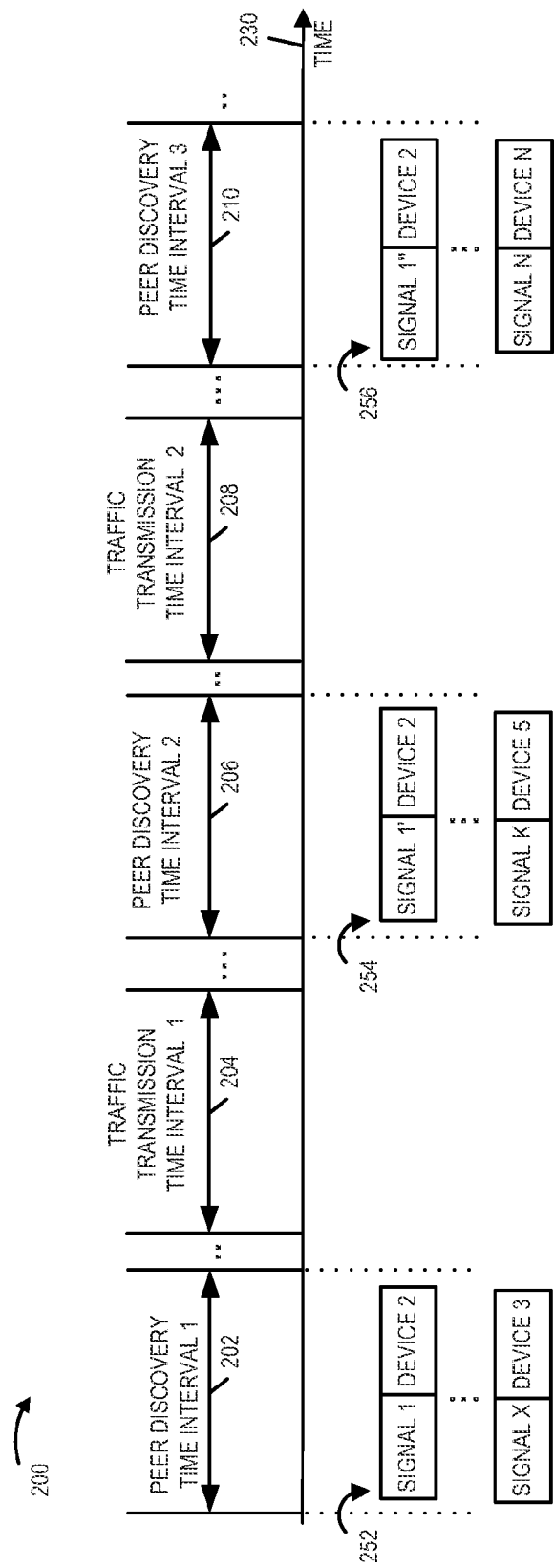
FIG. 2 illustrates exemplary time intervals which recur in an exemplary peer to peer transmission time schedule, in accordance with various embodiments.

FIG. 2 illustrates exemplary time intervals which recur in an exemplary peer to peer transmission time schedule 200, in accordance with various embodiments. The horizontal axis 230 in FIG. 2 represents time. The illustrated transmission time schedule 200 includes a plurality of time intervals including peer discovery time intervals and traffic transmission time intervals which are recurring in some embodiments. It should be appreciated that various time intervals (202, 204, 206, 208, 210) in schedule 200 need not be contiguous, e.g., one or more other time intervals may be interspersed between the illustrated time intervals (202, 204, 206, 208, 210). As illustrated, the sequence of time interval repeats as part of a recurring timing schedule.

In accordance with one aspect of some embodiments, one or more communications devices in a communications system, e.g., mobile communications devices in system 100, receive peer discovery signals broadcast by one or more other devices in the peer discovery time intervals such as time intervals 202, 206, 210. The peer discovery signals are transmitted by various devices in one or more peer discovery time intervals so that other devices in the system can discover the presence of the transmitting devices and/or receive other information transmitted by the transmitting devices. Directed communications, e.g., such as traffic transmission from one device to another, occur in other time periods such as traffic transmission time intervals 204, 208. In various embodiments, the mobile communications devices measure at least one RF characteristic of the received peer discovery signals, and store the signal measurement information in combination with a mobile device identifier identifying the mobile device to which the signal measurement information corresponds and a time stamp indicating the time of signal measurement. The device identifier of a transmitting device is determined from the peer discovery signal received from the transmitting device.

By way of the peer to peer timing schedule shown in FIG. 2, we will consider one example where the peer discovery signals are received by a mobile communications device, e.g., device 1 102. As indicated using reference numbers 252, 254, 256 and should be appreciated from the figure, a plurality of peer discovery signals corresponding to multiple different peer devices may be received by device 1 102 during each peer discovery time interval. For example, during peer discovery time interval 1 202, peer discovery signal 1 is received from, e.g., device 2 104, and peer discovery signal X is received from, e.g., device 3 106.

During peer discovery time interval 2 206, a plurality of signals may be received as shown, including peer discovery signal 1' received from device 2 104, and peer discovery signal K which is received from the peer communications device 5 110. Similarly, during peer discovery time interval 3 210, peer discovery signal 1" is received from device 2 104, and peer discovery signal N is received from the peer communications device N 118. Thus it should be appreciated that multiple peer discovery signals corresponding to different peer devices may be received during the same or a different peer discovery time interval. Further, in accordance with one aspect signal measurements may be performed on a plurality of peer discovery signals, corresponding to the same peer device, received at different times.

Figure 3:
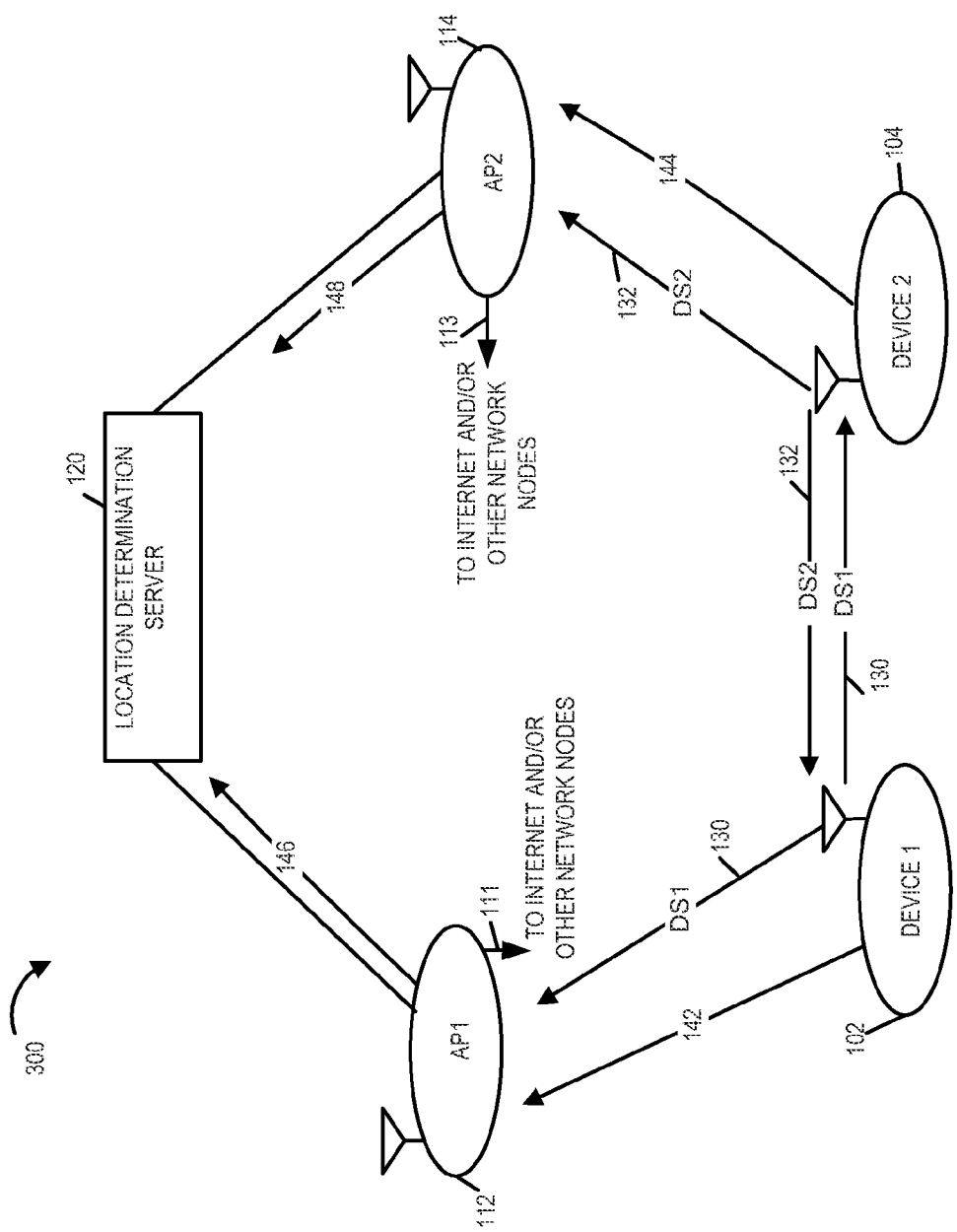
FIG. 3 is a more detailed illustration of a portion of the exemplary wireless communications system of FIG. 1, showing the signaling exchange between various devices in greater detail, in accordance with one exemplary embodiment.

FIG. 3 is a more detailed illustration of a portion of the exemplary wireless communications system of FIG. 1, showing the signaling exchange between various devices in greater detail, in accordance with one exemplary embodiment. As discussed, in accordance with one feature of various embodiments various mobile communications devices measure at least one RF characteristic of the received peer discovery signals, and store the signal measurement information in combination with a device identifier identifying the mobile device to which the signal measurement information corresponds and a time stamp indicating the time of signal measurement. In the example of FIG. 3, device 1 102 receives a peer discovery signal (DS2) 132 broadcast by device 2 104, e.g., in a peer discovery time interval. The mobile communications device 1 102 performs signal measurement on the received signal 132 and stores the signal measurement information along with a device identifier identifying device 2 104 and a time stamp. In a similar manner device 2 104 which also receives a peer discovery signal (DS1) 130 broadcast by the device 1 102, performs signal measurement on the received signal 130 and stores the signal measurement information along with a device identifier identifying device 1 102 and a time stamp indicating the time of signal receipt. In accordance with one aspect of some embodiments the mobile devices 1 102, 2 104 communicate the stored signal measurement and device identifier and time information to the access points AP1 112, AP2 114 to which they are respectively attached in this example, when a transmission constraint is satisfied. The communication of a signal measurement information along with device identifier and time information in a report is represented by signals 142, 144 sent from the mobile devices 1 102, 2 104 to the access points 112, 114 respectively.

As shown, the access points AP1 112, AP2 114 also receive the broadcast peer discovery signals DS1 130, DS2 132 respectively, and independently perform direct mobile-to-access point signal measurements on the received signals DS1 130, DS2 132 on their own, e.g., calculate signal power level and/or another characteristic of the received signal. The access points 112, 114 then combine the determined mobile-to-access point signal measurements with the signal measurement information and other information included in signals 142, 144 received from mobile devices 1 102, 2 104. The combined information is communicated from the access points 112, 114 to the location determination server 120 using signals 146, 148 which are sent, e.g., over the backhaul link. The location determination server 120 uses the combined information to compute the paths/positions for various devices in the system. In various embodiments, in calculating the current and/or past positions of mobile devices, the location determination server 120 uses a set of fingerprint prediction maps corresponding to a set of possible locations of the mobile devices transmitting the signals, e.g., by comparing the received signal measurements against the map of predicted values. In some embodiments the location determination server 120 also uses the combined information collected from one or more access points to update the fingerprint prediction maps so that future positioning calculations are more precise and may exhibit greater accuracy.

In various embodiments mobile devices perform signal measurements on the signals received from other mobile devices at various points in time, e.g., to build up historical signal measurement data. The mobile devices such as device 1 102, 2 104 collect the historical signal measurement information and reports the signal measurement information along with device identifiers and time stamp of when the signals were received, to the access points. The access points communicate the received historical signal measurement information and the device and time related information to the location determination server 120. Thus, the location determination server 120 uses information corresponding to multiple signal measurements to calculate the position of various mobile devices in the system.

Figure 4:
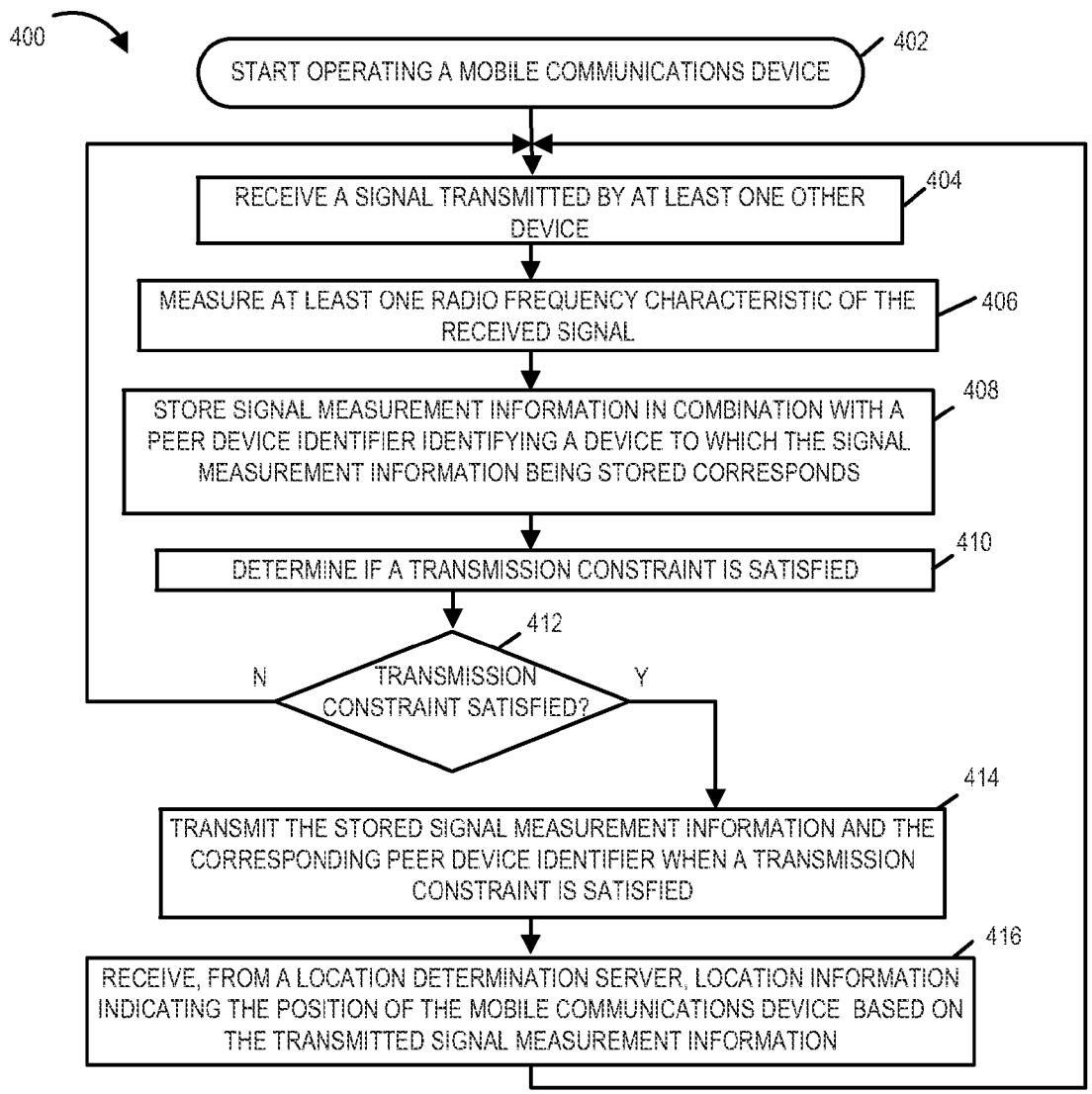
FIG. 4 is a flowchart of an exemplary method of operating a mobile communications device in accordance with an exemplary embodiment.

FIG. 4 is a flowchart 400 of an exemplary method of operating a mobile communications device, in accordance with an exemplary embodiment. The mobile communications device implementing the method of flowchart 400 is, e.g., any one of the wireless mobile communications devices of system 100 of FIG. 1. For the purpose of illustration, we will consider that the steps shown in the exemplary method of flowchart 400 are being implemented by peer mobile communications device 1 102. As will be discussed, in accordance with one feature of various embodiments, the peer device 1 102 communicates signal measurement information corresponding to signals received from one or more other wireless mobile communications devices in the system 100, to the location determination server 120, e.g., via an access point. Operation starts in step 402, where device 1 102 is powered on and initialized. Operation proceeds from start step 402 to step 404.

In step 404 device 1 102 receives a signal transmitted by at least one other device, e.g., such as signal 132 transmitted by device 2 104 in system 100. It should be appreciated that device 1 102 may receive a plurality of signals from other peer devices as well. Thus in some embodiments the received signal 132 is one of a plurality of received signals corresponding to multiple different devices. In some embodiments the received signal 132 is a peer discovery signal. Various communications devices in the system 100 including peer device 1 102 periodically transmit, e.g., broadcast, peer discovery signals. The peer discovery signals are normally transmitted during the recurring peer discovery time intervals, and may include, e.g., device discovery and/or other information. In various embodiments the received signal includes a unique device identifier or at least a portion of a device identifier identifying the transmitting device. Thus each signal may communicate a device identifier or multiple signals from the same device in combination indicate the device identifier. The device identifier may be a peer discovery unique ID, a local ID or an SSID. Still, for the purpose of discussion of flowchart 400 we will consider that the received signals on which measurements are performed are peer discovery signals. It should be appreciated that the received signal on which measurements are performed is a peer discovery signal in some embodiments, however the received signal may be an RF signal such as service set identifier (SSID) signal, paging signal, data traffic signal etc. In some embodiments the received signal is one of an infrared, sound, light and temperature signal. The received signals may be signals dedicated for the purpose of positioning.

Operation proceeds from step 404 to step 406. In step 406 device 1 102 measures at least one RF characteristic of the received signal. In some embodiments the at least one RF characteristic includes one of received signal power, frequency and multi-path delay spread. Thus when device 1 102 receives a plurality of peer discovery signals, it measure the at least one RF characteristic, e.g., signal power level, of each the received peer discovery signals. The operation proceeds from step 406 to step 408 where the device 1 102 stores, e.g., in a memory, signal measurement information in combination with a peer device identifier identifying the device to which the signal measurement information being stored corresponds, and a time stamp indicating the time of signal measurement. In various embodiments the device 1 102 stores signal measurement information corresponding to a plurality of received signals from various devices in the system.

Operation proceeds from step 408 to step 410. In step 410 the mobile device 1 102 determines if a transmission constraint is satisfied. In accordance with one aspect, various devices check whether or not a transmission constraint is satisfied prior to off-loading, i.e., communicating, the stored signal measurement information and other information stored in combination with the signal measurement information to one or more access points such as APs 112, 114. In various embodiments, determining whether the transmission constraint is satisfied includes determining whether at least one of: (i) a signal to noise ratio (SNR) condition corresponding to a communications link with an access point being satisfied, (ii) a storage limit being reached, e.g., maximum limit of the storage element used for storing signal measurements and related information is reached, (iii) a storage time limit being reached, e.g., maximum storage time for the signal measurements and related stored information is reached, and (iv) receipt of a request for information, e.g. a signal requesting information corresponding to one or more devices is received from the location determination server 120 via an AP. Thus in various embodiments device 1 102 is configured to determine if at least one of the above noted transmission constraints is satisfied.

In some embodiments to determine if the link quality of a communications link between the mobile device 1 102 and an access point, e.g., such as AP 1 112, the mobile device 1 102 estimates the signal to noise ratio using a pilot signal that the access points periodically transmit. In the scenario when the mobile device 1 102 has an opportunity to select an access point to transmit from a plurality of access points, the mobile device 1 102 may choose the physically closest access point or an access point which has the highest SNR with respect to the mobile device 1 102.

Operation proceeds from step 410 to step 412 which is a decision step. In step 412 it is decided (based on the determination in step 410) how the operation would proceed. If it is determined that at least one transmission constraint is satisfied, the operation proceeds from step 412 to 414. If in step 410 it is determined that a transmission constraint is not satisfied, the operation proceeds back to step 404.

In step 414 device 1 102 transmits the stored signal measurement information and the corresponding peer device identifier, to an access point, e.g., to AP 1 112. In some embodiments the transmitted stored signal measurement information includes information corresponding to multiple signal measurements corresponding to the same peer mobile device identifier but which were measured at different times. For example, mobile device 1 102 may receive multiple peer discovery signals from the same device, e.g., during different peer discovery intervals, and the mobile device 1 102 may perform measurement corresponding to each of these received peer discovery signal and collect the signal measurement information. Each set of the signal measurement information may, and in some embodiments is, stored with a time stamp indicating the time of signal measurement. In various embodiments the information corresponding to multiple signal measurements includes time stamps used to indicate a time corresponding to each of the multiple signal measurements. Thus, in some embodiments the multiple signal measurements corresponding to the same device made over time are stored and transmitted to the location determination server 120 via an access point such as AP 1 112.

In some embodiments the transmitted stored signal measurement information includes information corresponding to multiple signal measurements corresponding to different peer mobile device identifiers which correspond to signals received during the same peer discovery interval. For example signal measurements made on signals received by device 1 102 from a plurality of other devices, e.g., mobile devices 104, 106, 108 etc., during a peer discovery time interval may be collected and transmitted together to an access point when a transmission constraint is satisfied. In one embodiment the mobile device 1 102 transmits the signal measurement information along with the device identifiers and time stamps when the amount of stored information in the mobile device 1 102 reaches a certain threshold, e.g., when the maximum storage element capacity is reached. In another embodiment the stored signal measurement information and related information is transmitted upon receiving a request, e.g., a request for signal measurement information corresponding to a particular peer device or a group of peer devices, from the location determination server 120.

The access point AP 1 112 receiving the transmitted stored information from the mobile device 1 102, also performs mobile-to-access point signal measurements on the peer discovery signal(s) received from device 1 102 and one or more other devices as discussed in the FIG. 3 example in detail. The AP 1 112 then aggregates the received signal measurement and related information, and the mobile-to-access point signal measurement information that the AP 112 calculated. In various embodiments the aggregated combined information is then sent from the access point to the location determination server 120. The location determination server 120 uses the received combined information to calculate the positions/locations of the mobile devices to which the signal measurement information in the combined information corresponds. Also as discussed, in some embodiments in calculating the current and/or past positions of various mobile devices, the location determination server 120 uses a set of fingerprint prediction maps corresponding to a set of possible locations of the mobile devices transmitting the signals.

Operation proceeds from step 414 to step 416. In step 416 the mobile device 1 102 receives, from the location determination server 120, the location information indicating the position of the mobile device 1 102, based on the transmitted signal measurement information. In various embodiments the location information is received by mobile device 1 102, e.g., via the access point 1 112. The operation proceeds from step 416 back to step 404.

Figure 5:
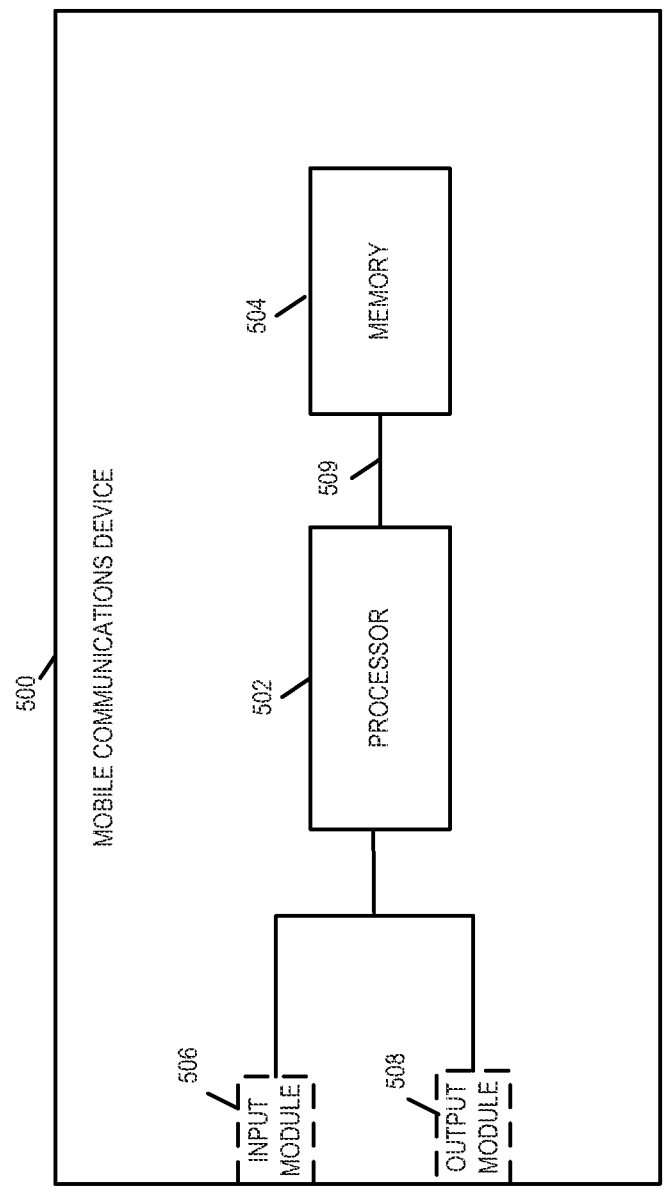
FIG. 5 is an exemplary mobile communications device in accordance with an exemplary embodiment.

FIG. 5 is a drawing of an exemplary mobile communications device 500, in accordance with an exemplary embodiment. Exemplary mobile communications device 500 may be used as any one of the wireless mobile communications devices of FIG. 1 such as mobile device 1 102. Exemplary mobile communications device 500 may, and sometimes does, implement a method in accordance with flowchart 400 of FIG. 4.

The mobile communications device 500 includes a processor 502 and memory 504 coupled together via a bus 509 over which the various elements (502, 504) may interchange data and information. The memory 504 may include an assembly of modules used to control the mobile communications device, e.g., such as the assembly of modules shown in FIG. 6. The mobile communications device 500 further includes an input module 506 and an output module 508 which may be coupled to processor 502 as shown. However, in some embodiments, the input module 506 and output module 508 are located internal to the processor 502. Input module 506 can receive input signals. Input module 506 can, and in some embodiments does, include a wireless receiver and/or a wired or optical input interface for receiving input. Output module 508 may include, and in some embodiments does include, a wireless transmitter and/or a wired or optical output interface for transmitting output.

Processor 502 is configured to receive a signal transmitted by at least one other device; measure at least one RF characteristic of the received signal; store signal measurement information in combination with a peer device identifier identifying a device to which the signal measurement information being stored corresponds; and transmit the stored signal measurement information and the corresponding peer device identifier when a transmission constraint is satisfied. In various embodiments the processor 502 is configured to determine whether a transmission constraint is satisfied, prior to transmitting the stored signal measurement information. In some embodiments the transmission constraint includes at least one of a signal to noise ratio condition being satisfied, a storage limit being reached, a storage time limit being reached (e.g., maximum storage time is reached) and, receipt of a request for information. In some embodiments the at least one radio frequency characteristic includes one of: power, frequency, and multi-path delay spread.

In some embodiments the received signal is one of a plurality of signals, said plurality of received signals corresponding to multiple different devices. In various embodiments, the received signal is a peer discovery signal. In various embodiments the processor 502 is further configured to determine the peer device identifier identifying a device to which the signal measurement information corresponds, from the received signal. In some embodiments multiple peer discovery signals received from a peer device in combination indicate the peer device identifier. In some embodiments the transmitted stored signal measurement information includes information corresponding to multiple signal measurements corresponding to the same peer device identifier but which were measured at different times. In some embodiments the information corresponding to multiple signal measurements includes time stamps used to indicate a time corresponding to each of the multiple signal measurements. In some embodiments the transmitted stored signal measurement information further includes information corresponding to multiple signal measurements corresponding to different peer device identifiers which correspond to signals received during the same peer discovery interval.

The processor 502 is further configured to receive position information indicating the position of the mobile communications device 500 based on the transmitted signal measurement information.

Figure 6:
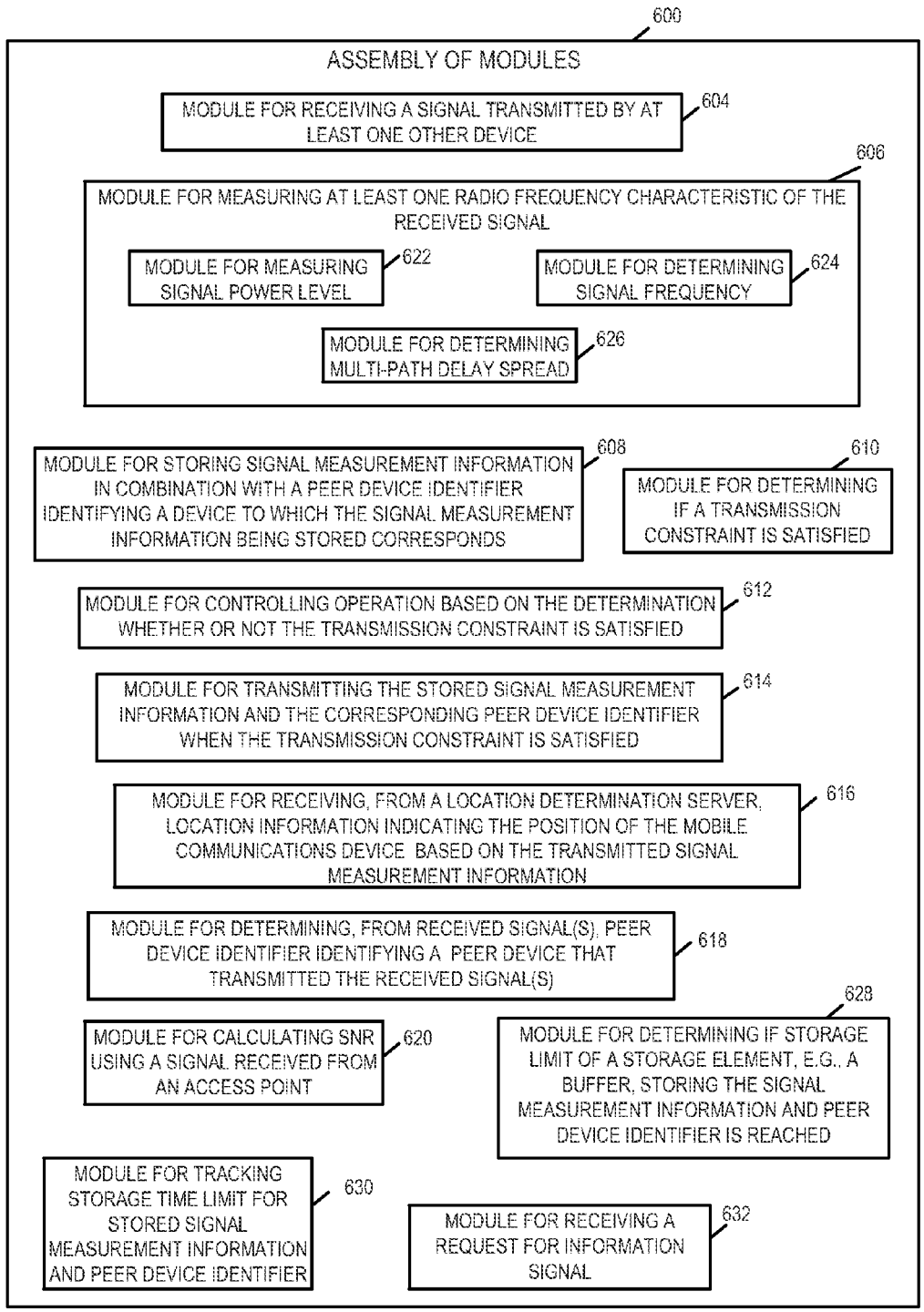
FIG. 6 is an assembly of modules which may be used in the exemplary mobile communications device of FIG. 5.

FIG. 6 illustrates an assembly of modules 600 which can, and in some embodiments is, used in the mobile communications device 500 illustrated in FIG. 5. The modules in the assembly 600 can be implemented in hardware within the processor 502 of FIG. 5, e.g., as individual circuits. Alternatively, the modules may be implemented in software and stored in the memory 504 of the mobile communications device 500 shown in FIG. 5. While shown in the FIG. 5 embodiment as a single processor, e.g., computer, it should be appreciated that the processor 502 may be implemented as one or more processors, e.g., computers. When implemented in software the modules include code, which when executed by the processor, configure the processor, e.g., computer, 502 to implement the function corresponding to the module. In some embodiments, processor 502 is configured to implement each of the modules of the assembly of modules 600. In embodiments where the assembly of modules 600 is stored in the memory 504, the memory 504 is a computer program product comprising a computer readable medium comprising code, e.g., individual code for each module, for causing at least one computer, e.g., processor 502, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 6 control and/or configure the wireless mobile communications device 500 or elements therein such as the processor 502, to perform the functions of the corresponding steps illustrated and/or described in the method of flowchart 400 of FIG. 4.

The assembly of modules 600 includes a module corresponding to each step of the method of flowchart 400 shown in FIG. 4. For example module 604 corresponds to step 404 and is responsible for performing the operation described with regard to step 404. The assembly of modules 600 includes a module 604 for receiving a signal transmitted by at least one other device, a module 606 for measuring at least one RF characteristic of the received signal, a module 608 for storing signal measurement information in combination with a peer device identifier identifying a device to which the signal measurement information being stored corresponds, and a module 610 for determining if a transmission constraint is satisfied.

In some embodiments the module 606 includes a module 622 for measuring a signal power level of the received signal, a module 624 for determining signal frequency of the received signal, and a module 626 for determining multi-path delay spread. The assembly of modules 600 in some embodiments further includes a module 612 for controlling the operation of device 500 (employing the assembly of modules 600) based on the determination whether or not the transmission constraint is satisfied, a module 614 for transmitting the stored signal measurement information and the corresponding peer device identifier when a transmission constraint is satisfied, and a module for receiving position information indicating the position of the mobile communications device, from a location determination server, based on the transmitted signal measurement information.

In some embodiments the transmitted stored signal measurement information includes information corresponding to multiple signal measurements corresponding to the same peer device identifier but which were measured at different times. In some embodiments the information corresponding to multiple signal measurements includes time stamps used to indicate a time corresponding to each of the multiple signal measurements. In some embodiments the transmitted stored signal measurement information further includes information corresponding to multiple signal measurements corresponding to different peer device identifiers which correspond to signals received during the same peer discovery interval.

In some embodiments the assembly of modules 600 further includes a module 618 for determining, from the received signal(s), peer device identifier identifying a peer device that transmitted the received signal(s), a module 620 for calculating signal to noise ratio using a signal received from an access point, a module 628 for determining if the storage limit of a buffer storing the signal measurement information, peer device identifier and the timing information is reached, a module 630 for tracking the storage time limit of the stored signal measurement, peer device identifier and time-stamp information corresponding to one or more peer devices, and a module 632 for receiving a request for information signal (from a location determination server, e.g., server 120, via an access point) requesting signal measurements and related information regarding one or more devices. In various embodiments, determining module 610, receives and may use input from one or more of the modules 620, 628, 630 and 632, for determining whether or not a transmission constraint is satisfied.

FIG. 7 illustrates an exemplary table 700 including information regarding exemplary rules for transmitting stored signal measurement and related information from a mobile communications device in accordance with an exemplary embodiment. The exemplary table 700 is, e.g., stored in memory 504 of the mobile communications device 500 and used by, e.g., module 612, of assembly of modules 600 when implementing a method in accordance with flowchart 400 of FIG. 4. Row 702 indicates that when a determination of the transmission constraint condition indicates that one or more access points with a communications link to the mobile device 500 are available, with each link having a signal to noise (SNR) ratio above a minimum threshold level, then the mobile device may, and sometimes does, transmit the stored signal measurement information along with the device identifier and time stamp to an access point having a communications link with highest SNR level.

Row 704 indicates that if the determination of the transmission constraint condition indicates that the amount of stored signal measurement and related information reaches a threshold level, e.g., when the storage limit of a buffer storing this information is reached, then the mobile communications device may, and sometimes does, transmit the stored signal measurement information along with the device identifier and time stamp to the closest access point or an access point having a communications link with highest SNR level. Row 706 indicates that if the determination of the transmission constraint condition indicates that if storage time limit corresponding to one or more sets of stored signal measurements and related information is reached, then the mobile device may, and sometimes does, transmit the stored signal measurement information along with the device identifier and time stamp corresponding to which the storage time limit is reached. Again, the information is normally transmitted to an access point with best available communication link quality with the mobile device 500.

Row 708 indicates that if the determination of the transmission constraint condition indicates that if a request for information requesting signal measurements and related information regarding one or more devices is received, then the mobile device may, and sometimes does, transmit the stored signal measurement information along with the device identifier and time stamp corresponding to the one or more devices regarding which the request is received, e.g., to an access point via which the request is received.

Figure 8:
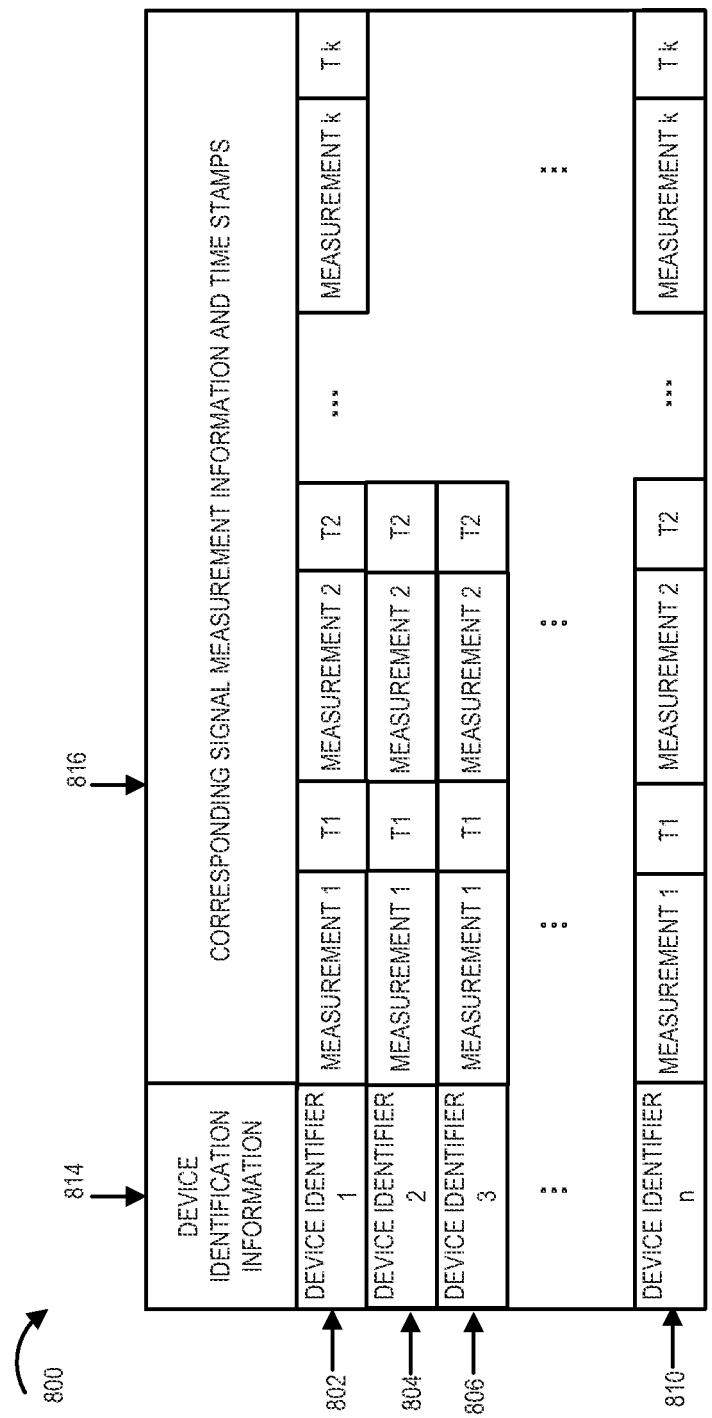
FIG. 8 is an illustration of stored signal measurement and related information stored in a memory, in accordance with one exemplary embodiment.

FIG. 8 illustrates an exemplary table 800 including stored signal measurement information, device identifier information and the time stamps indicating the time of corresponding signal measurements. As shown, a plurality of signal measurements corresponding to multiple device identifiers are included in the table 800. The information included in table 800 is stored in a storage element, e.g., in the memory 504, the storage element may have a fixed size and is dedicated to store the information shown in table 800. In accordance with one aspect of some embodiments, the mobile communications device 500 receive peer discovery signal(s) from at least one other device, measures at least one RF characteristic of the received peer discovery signals, and store the signal measurement information in combination with a device identifier identifying the mobile device to which the signal measurement information corresponds and a time stamp indicating the time of signal measurement. Exemplary table 800 includes the information stored by device 500 upon performing the signal measurements.

Each of the rows 802, 804, 806, . . . , 810 correspond to an individual mobile communications device identified by the device identifiers shown by each individual entry in column 814. Column 816 includes signal measurement information and the time stamps indicating the time of the corresponding signal measurement, corresponding to each of the device identifiers indicated in the rows 802, 804, 806, . . . , 810.

As shown, row 802 corresponds to device identifier 1, and a plurality of signal measurements performed on one or more signals received from the device to which the Device Identifier 1 corresponds, are indicated in the same row along with the time stamp. For example in row 802, measurement 1 indicates the measured RF characteristic of a signal received from the device identified by the Device Identifier 1 and T1 indicates the time of measurement 1. Measurement 2 in row 802 indicates the signal measurement information of, e.g., another peer discovery signal, received from the same peer device having Device Identifier 1 at different time indicated by T2. Measurement k in row 802 indicates the signal measurement information corresponding to yet another peer discovery signal received from the same peer device having Device Identifier 1, at a time indicated by Tk.

Similarly other rows 804, 806, . . . , and 810 include signal measurement and time information (shown under column 814) corresponding to various devices identified by the device identifiers such as Device Identifier 2, Device Identifier 3, . . . , and Device Identifier n. Thus the stored information in table 800 includes information corresponding to multiple signal measurements corresponding to the same peer device identifier but which were measured at different times, as well as information corresponding to multiple signal measurements corresponding to different peer device identifiers.

Figure 9:
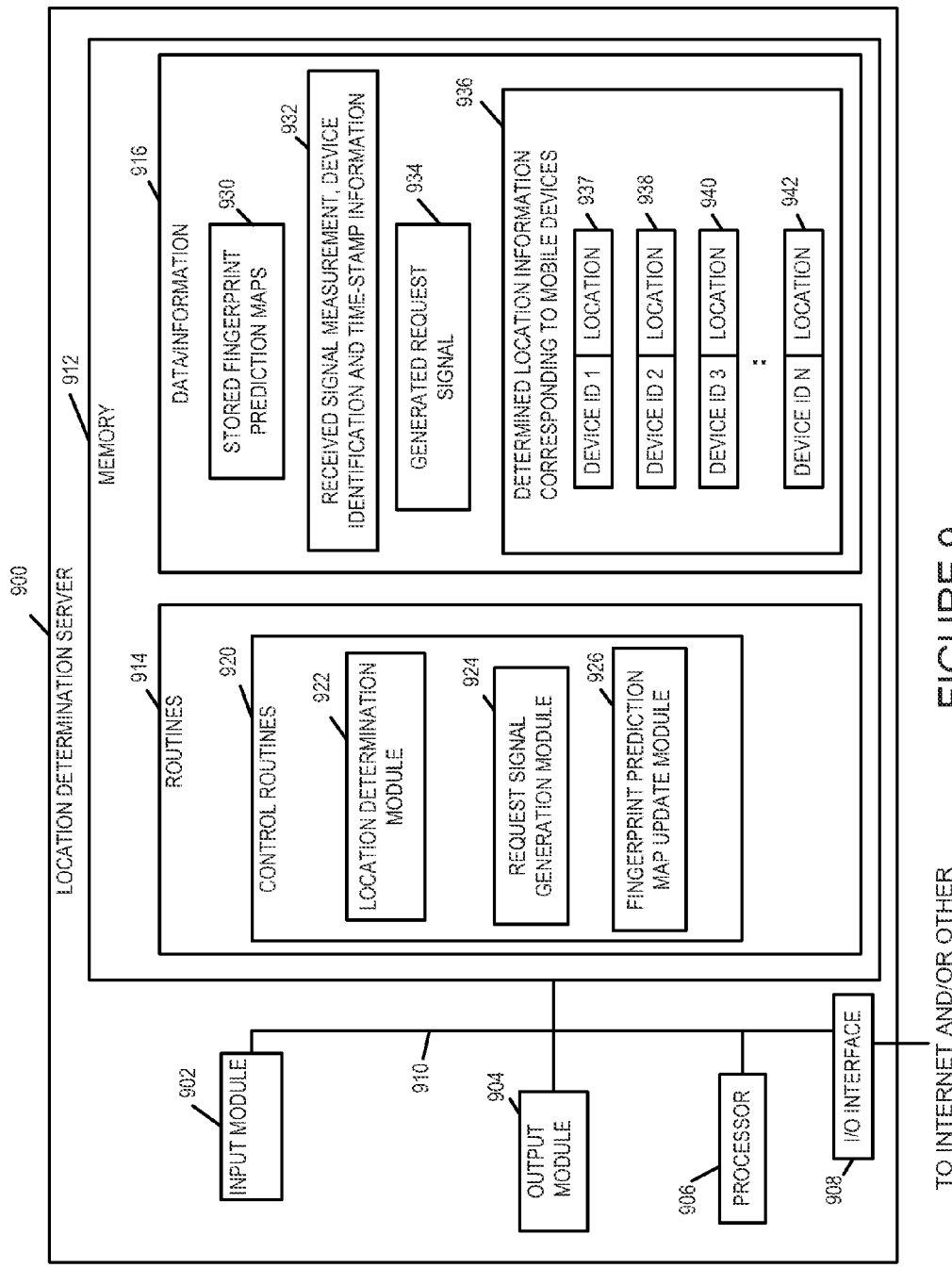
FIG. 9 illustrates an exemplary location determination server in accordance with an exemplary embodiment.

FIG. 9 illustrates an exemplary location determination server 900 which may be used as the location determination server 120 of FIG. 1, in accordance with an exemplary embodiment. In accordance with one aspect a mobile communications device in system 100 one or more devices receive signals, e.g., peer discovery signals, from other communications devices in the system, measure a radio frequency (RF) characteristic of the received signal(s) and reports the signal measurement information along with a peer device identifier identifying a device to which the signal measurement information corresponds, to the location determination server 900 via an access point, e.g., such as AP 112, 114, when a transmission constraint is satisfied. The location determination server 900 receives a plurality of sets of information including signal measurement information corresponding to various devices received from the access points in the system 100.

The location determination server 900 is responsible for calculating the location of one or more devices in the system, e.g., using the signal measurements corresponding to the one or more devices. The location determination server 900 includes an input module 902, output module 904, a processor 906, an input/output (I/O) interface 908, and a storage element, e.g., memory 912, coupled together via a bus 910 over which the various elements may interchange data and information.

Memory 912 includes routines 914 and data/information 916. The processor 906, e.g., a CPU, executes the routines 914 and uses the data/information 916 in memory 912 to control the operation of the server.

Via the input module 902, location determination server 900 can receive input signals from other devices and/or network nodes. Received signals may include, e.g., signal measurement information and related information from access points. The output module 904 is used for communicating signals and/or other information to other communications devices. In some embodiments, signals communicated from the location determination server 900 include location signals indicating the determined position of a mobile communications device, e.g., such as device 1 102.

Routines 914 include the control routines 920. The processor 906 executes control routines 920 for controlling the operation of various elements of the location determination server 900. The control routines 920 include a location determination module 922, a request signal generation module 924, and a fingerprint prediction map update module 926. In various embodiments location determination module 922 is configured to determine the current and/or past positions of mobile devices such as device 1 102, e.g., using the received signal measurement information 932 corresponding to various devices, and the fingerprint prediction maps 930 stored in the memory 912. In various embodiments the fingerprint prediction maps 930 are maps of predicted values corresponding to a set of possible locations of the mobile devices transmitting the signals on which signal measurements are performed. In some embodiments the fingerprint prediction map update module 926 uses the received signal measurement, device identifier, and time-stamp information 932 corresponding to various mobile devices (communicated from one or more access points) to update the fingerprint prediction maps so that future positioning calculations are more precise and may exhibit greater accuracy.

The request signal generation module 924 is configured to generate a request for information signal 934 requesting signal measurement and related information corresponding to one or more devices. In some embodiments the location determination server 900 requests signal measurement information corresponding one or more devices, e.g., aggregated over time by various other mobile devices in the system 100, when, e.g., such information is desired for more precise and accurate calculation of location of various mobile devices in the system. In some embodiments, mobile communications device 1 102 is configured to transmit the stored signal measurement information corresponding to one or more devices, to an access point such as AP 1 112, upon receipt of the request signal 934.

Data/information 916 includes the received signal measurement, device identifier, and time-stamp information 932 corresponding to various mobile devices which is used in calculating the location and/or paths of various mobile devices in the system. The set of information 932 includes information that may be measured and aggregated over a period of time by various mobile devices in system 100 and then transmitted to the location determination server 900 via access points. The determined location information corresponding to mobile devices 936 is the output generated by the location determination module 922. The determined location information 936 includes a plurality of sets of information 937, 938, 940, and 942 regarding the location of mobile devices in the system 100, and may be communicated to these mobile devices as desired. Each set of information 937, 938, 940, 942 includes location information indicating the position of the mobile communications device and a device ID identifying the device for which the location has been determined. In some embodiments the each set of information 937, 938, 940, 942 also includes the time of location determination.

In various embodiments a mobile communications device, e.g., communications device 500 of FIG. 5, includes a module corresponding to each of the individual steps and/or operations described with regard to any of the Figures in the present application and/or described in the detailed description of the present application. The modules may, and sometimes are implemented in hardware. In other embodiments, the modules may, and sometimes are, implemented as software modules including processor executable instructions which when executed by the processor of the communications device cause the device to implement the corresponding step or operation. In still other embodiments, some or all of the modules are implemented as a combination of hardware and software.

In accordance with one feature of some embodiments the location determination server determines an estimate of the location of various mobile devices in the system using a graphical probabilistic model, e.g., using Bayesian inference.

In some embodiments a sophisticated channel model based on the RF fingerprint maps is used which performs much better in indoor environments.

One advantage of the exemplary method in accordance with some embodiments is that the network element, i.e., the location determination server 900, uses multiple measurements over time to calculate a position estimate for various mobile devices. In some embodiments a mobile measures and stores the strength of the signals transmitted by other mobiles, along with the time-stamps of when these signals were recorded and the device identifiers corresponding to the mobiles that it tracks. This mobile then transmits this historical information to the network element, which combines this information with the direct mobile-to-access point signal measurements to estimate the position of various mobile devices in the system.

In one embodiment, a mobile device, e.g., device 1 102, may choose when and to which anchor point to send the time-stamps and fingerprint measurements of the other mobiles. The mobile may choose to send this information to the closest anchor point, or the one which has the highest signal to noise ratio with respect to that mobile. The mobile may estimate the signal to noise ratio using a pilot signal that anchor point periodically transmits. In another embodiment, the mobile may choose to send the time-stamps and measurements when the amount of stored information in the mobile device reaches a certain threshold. In yet another embodiment, the mobile may transmit the accumulated information upon request from a network device.

In accordance with various embodiments, mobile devices, e.g., peer devices in a communications system, measure one or more signal characteristics, e.g., received signal power level, of signals received from peer devices. The mobile devices report this information along with information identifying the peer devices to which individual signal measurements correspond. In some embodiments the mobile device measured signals are peer discovery signals transmitted at a known power level and communicating a device identifier.

The reported signal measurement information is received by a node in the network, e.g., a location determination server. The node in the network determines the location of individual mobile devices in the system using the signals transmitted by the devices and measured by the access points along with the signal measurement and device identifier information reported by mobile devices. Since a general determination of the reporting device's location can be made from the signals received by the fixed access points (APs), also sometimes called anchor points, the mobile device signal measurements provides an additional set of information which can be and is used, in combination with signal information from the fixed anchor points to determine the location of individual mobile devices to a level of accuracy which would not be possible without the mobile device signal measurements and reports of those measurements to the network device responsible for making location determinations.

By using the reported signal measurements made by the mobile communications devices in addition to the signal measurements made by the fixed Access Points, the location determination server is able to determine the location of individual mobile devices with far greater accuracy than would be possible based on the AP signal measurements alone.

Various embodiments discuss the use of signal measurements pertaining to the links between the mobiles themselves in order to improve positioning accuracy which can be used in addition to the anchor point signal measurements.

In one embodiment, a mobile device measures the characteristics (fingerprints) of signals received from other mobiles. These signals may be peer discovery signals that the mobiles ordinarily transmit or they may be signals dedicated for the purposes of positioning. The mobile stores and time-stamps the measured fingerprints of the signals received from the other mobiles, and sends the time-stamps and fingerprints, along with the corresponding mobile identifiers, to an anchor point. A mobile identifier may be a peer discovery unique ID, a local ID or an SSID. Once it receives the information, the anchor point, or a network device linked with it, may then compute the paths/positions for various mobile devices using the available information. In various embodiments this information includes both the direct mobile-to-anchor point signal measurements as well as the mobile-to-mobile signal measurements. A network device such as the location determination server or an anchor point supporting location determination functionality may then send the estimated positions (past or present) to the mobile devices.

In some embodiments, in calculating the current or past positions of the mobile devices, the anchor point supporting location determination functionality or the network device, e.g., the location determination server, may use a set of fingerprint prediction maps corresponding to a set of possible transmitter locations. The network device may also use the collected information to update the fingerprint prediction map so that future positioning operations may exhibit greater accuracy. The time stamps may be referenced to a local notion of time shared by all the mobiles. The local notion of time may be the same notion of time used for synchronization of the network.

In one embodiment, the mobile may choose when and to which anchor point to send the time-stamps and fingerprint measurements of the other mobiles. The mobile may choose to send this information to the closest anchor point, or the one which has the highest signal to noise ratio with respect to that mobile. The mobile may estimate the signal to noise ratio using a pilot signal that anchor point periodically transmits. In another embodiment, the mobile may choose to send the time-stamps and measurements when the amount of stored information in the mobile device reaches a certain threshold. In yet another embodiment, the mobile transmits the accumulated information upon request from a network device. In this case, the network device may request measured fingerprint information regarding a specific peer or group of peers.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal receiving, storing, processing, and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a mobile communications device, the method comprising:
    receiving a signal transmitted by at least one other device;
    measuring at least one radio frequency characteristic of the received signal; storing signal measurement information in combination with a peer device identifier identifying a device to which the signal measurement information being stored corresponds; and
    transmitting the stored signal measurement information and the corresponding peer device identifier when a transmission constraint is satisfied, further comprising:
    determining if the transmission constraint is satisfied prior to transmitting the stored signal measurement, said determining including determining that one or more access points with a communications link to the mobile communications device having a signal to noise ratio above a threshold are available; and
    wherein said transmitting includes:
    transmitting the stored signal measurement information and the corresponding peer device identifier to an access point with a communications link with said mobile communications device having a highest signal to noise ratio.

2. The method of claim 1,
    wherein said peer device identifier is a first peer device identifier included in the received signal; and
    wherein said signal measurement information includes a plurality of pairs of signal strength and time information corresponding to the first peer device identifier but different times, the signal strength information indicating a measured signal strength and the corresponding time information indicating the time to which the measured signal strength corresponds.

3. The method of claim 2, wherein storing signal measurement information further includes:
    storing said signal measurement information corresponding to additional device identifiers, the signal measurement information corresponding to at least some additional device identifiers corresponding to at least some of the same times as the signal measurement information corresponding to the first device identifier.

4. The method of claim 3, wherein storing signal measurement information includes storing time stamps used to indicate a time corresponding to a signal measurement for which information is stored.

5. The method of claim 3,
    wherein said received signal is a peer discovery signal; and
    wherein said transmitted stored signal measurement information further includes information corresponding to multiple signal measurements corresponding to different peer device identifiers which correspond to signals received during the same peer discovery interval.

6. The method of claim 1, further comprising:
    receiving, from a location determination server, location information indicating the position of the mobile communications device based on the transmitted signal measurement information.

7. The method of claim 1, wherein said at least one radio frequency characteristic includes one of: frequency or multipath delay spread.

8. The method of claim 1,
    wherein said peer device identifier is a first peer device identifier; and
    wherein said transmission constraint includes a storage limit being reached for the set of data corresponding to said first peer device identifier.

9. The method of claim 1 wherein said signal transmitted by at least one other device is a paging signal.

10. The method of claim 1, wherein said signal transmitted by at least one other device is a data traffic signal.

11. The method of claim 1, wherein said signal is a sound signal.

12. A mobile communications device, comprising:
    means for receiving a signal transmitted by at least one other device;
    means for measuring at least one radio frequency characteristic of the received signal;
    means for storing signal measurement information in combination with a peer device identifier identifying a device to which the signal measurement information being stored corresponds; and
    means for transmitting the stored signal measurement information and the corresponding peer device identifier when a transmission constraint is satisfied, further comprising:
    means for determining if the transmission constraint is satisfied, said determining being performed prior to transmission of the stored signal measurement information, said means for determining that one or more access points with a communications link to the mobile communications device having a signal to noise ratio above a threshold are available; and
    wherein said means for transmitting transmit the stored signal measurement information and the corresponding peer device identifier to an access point with a communications link with said mobile communications device having a highest signal to noise ratio.

13. The mobile communications device of claim 12, wherein said peer device identifier is a first peer device identifier included in the received signal; and
wherein said signal measurement information includes a plurality of pairs of signal strength and time information corresponding to the first peer device identifier but different times, the signal strength information indicating a measured signal strength and the corresponding time information indicating the time to which the measured signal strength corresponds.

14. The mobile communications device of claim 13, wherein storing signal measurement information further includes:
storing said signal measurement information corresponding to additional device identifiers, the signal measurement information corresponding to at least some additional device identifiers corresponding to at least some of the same times as the signal measurement information corresponding to the first device identifier.

15. The mobile communications device of claim 14, wherein said received signal is a peer discovery signal; and
wherein said transmitted stored signal measurement information further includes information corresponding to multiple signal measurements corresponding to different peer device identifiers which correspond to signals received during the same peer discovery interval.

16. The mobile communications device of claim 12, further comprising:
means for receiving, from a location determination server, location information indicating the position of the mobile communications device based on the transmitted signal measurement information.

17. The mobile communications device of claim 12, wherein said at least one radio frequency characteristic includes one of: frequency or multi-path delay spread.

18. A mobile communications device, comprising: at least one processor configured to:
receive a signal transmitted by at least one other device; measure at least one radio frequency characteristic of the received signal;
store signal measurement information in combination with a peer device identifier identifying a device to which the signal measurement information being stored corresponds; and
transmit the stored signal measurement information and the corresponding peer device identifier when a transmission constraint is satisfied; and
a memory coupled to said at least one processor, wherein said at least one processor is further configured to:
determine if the transmission constraint is satisfied prior to transmitting the stored signal measurement, said at least one processor being further configured to determine that one or more access points with a communications link to the mobile communications device having a signal to noise ratio above a threshold are available; and
transmit the stored signal measurement information and the corresponding peer device identifier to an access point with a communications link with said mobile communications device having a highest signal to noise ratio, as part of being configured to transmit the stored signal measurement information and the corresponding peer device.

19. The mobile communications device of claim 18, wherein said peer device identifier is a first peer device identifier included in the received signal; and
wherein said signal measurement information includes a plurality of pairs of signal strength and time information corresponding to the first peer device identifier but different times, the signal strength information indicating a measured signal strength and the corresponding time information indicating the time to which the measured signal strength corresponds.

20. The mobile communications device of claim 18, wherein said at least one processor is further configured to:
receive, from a location determination server, location information indicating the position of the mobile communications device based on the transmitted signal measurement information.

21. A computer program product for use in a mobile communications device, comprising:
non-transitory computer readable medium comprising:
code for causing at least one computer to receive a signal transmitted by at least one other device;
code for causing said at least one computer to measure at least one radio frequency characteristic of the received signal;
code for causing at least one computer to store signal measurement information in combination with a peer device identifier identifying a device to which the signal measurement information being stored corresponds; and
code for causing at least one computer to transmit the stored signal measurement information and the corresponding peer device identifier when a transmission constraint is satisfied and
code for causing at least one computer to determine if the transmission constraint is satisfied prior to transmitting the stored signal measurement and determine that one or more access points with a communications link to the mobile communications device having a signal to noise ratio above a threshold are available; and
wherein said code includes further code for transmitting stored signal measurement information and the corresponding peer device identifier to an access point with a communications link with said mobile communications device having a highest signal to noise ratio.

* * * * *